United States Patent
Ward (10) Patent No.: US 9,169,849 B2
(45) Date of Patent: Oct. 27, 2015

(54) GAS TURBINE ENGINE COMPRESSOR STATOR SEAL

(75) Inventor: Eric J. Ward, West Palm Beach, FL (US)

(73) Assignee: United Technologies Corporation, Hartford, CT (US)

( * ) Notice: Subject to any disclaimer, the term of this patent is extended or adjusted under 35 U.S.C. 154(b) by 777 days.

(21) Appl. No.: 13/466,549

(22) Filed: May 8, 2012

(65) Prior Publication Data

US 2013/0302140 A1    Nov. 14, 2013

(51) Int. Cl.

| | |
|---|---|
| *F01D 11/02* | (2006.01) |
| *F04D 29/10* | (2006.01) |
| *F04D 29/16* | (2006.01) |
| *F04D 29/32* | (2006.01) |
| *F01D 5/06* | (2006.01) |
| *F01D 11/00* | (2006.01) |
| *F04D 19/02* | (2006.01) |

(52) U.S. Cl.
CPC ............... *F04D 29/164* (2013.01); *F01D 5/06* (2013.01); *F01D 11/001* (2013.01); *F01D 11/02* (2013.01); *F04D 19/02* (2013.01); *F04D 29/102* (2013.01); *F04D 29/321* (2013.01)

(58) Field of Classification Search
CPC ..... F01D 11/001; F01D 11/02; F04D 29/083; F04D 29/102; F04D 29/122; F04D 29/164
USPC ............. 415/173.7, 174.5, 171.1; 416/198 A, 416/201 R
See application file for complete search history.

(56) References Cited

U.S. PATENT DOCUMENTS

| | | | |
|---|---|---|---|
| 3,995,971 | A | 12/1976 | White |
| 4,325,673 | A | 4/1982 | Hall |
| 5,158,430 | A | 10/1992 | Dixon et al. |
| 5,522,698 | A | 6/1996 | Butler et al. |
| 6,146,093 | A | 11/2000 | Lammas et al. |
| 6,210,106 | B1 | 4/2001 | Hawkins |
| 6,332,617 | B1 | 12/2001 | Leveaux et al. |
| 7,811,062 | B1 | 10/2010 | Twigg |
| 7,854,586 | B2 | 12/2010 | Major et al. |

(Continued)

FOREIGN PATENT DOCUMENTS

EP           1734292 A1 * 12/2006

OTHER PUBLICATIONS

International Preliminary Report on Patentability for International Application No. PCT/US2013/039616 mailed on Nov. 20, 2014.

(Continued)

*Primary Examiner* — Edward Look
*Assistant Examiner* — Jesse Prager
(74) *Attorney, Agent, or Firm* — Carlson, Gaskey & Olds, PC (57) ABSTRACT

A compressor section for use in a gas turbine engine has a plurality of compressor stages. Each compressor stage is provided with a rotor hub, and each rotor hub mounts a plurality of compressor blades. A rotor drum extends between adjacent rotor hubs. A plurality of stator stages have an outer ring and a radially inner ring. A plurality of vanes extend between the outer and inner rings. An inner surface of the inner ring is spaced by a gap from an outer surface of the rotor drum. The rotor drum is provided with a plurality of blades having a general airfoil shape to resist leakage across the gap.

3 Claims, 4 Drawing Sheets

(56) References Cited

U.S. PATENT DOCUMENTS

| | | |
|---|---|---|
| 7,946,808 B2 | 5/2011 | Taylor et al. |
| 2005/0175446 A1 | 8/2005 | Garner |
| 2007/0231144 A1 | 10/2007 | Schreiber |
| 2009/0317232 A1* | 12/2009 | Guemmer .................... 415/58.5 |
| 2010/0074731 A1 | 3/2010 | Wiebe et al. |
| 2010/0074734 A1* | 3/2010 | Little ......................... 415/173.7 |
| 2010/0178160 A1 | 7/2010 | Liotta et al. |
| 2010/0196139 A1* | 8/2010 | Beeck et al. .................. 415/111 |
| 2010/0196143 A1* | 8/2010 | Walker .......................... 415/144 |
| 2010/0322758 A1* | 12/2010 | Liebl et al. ................. 415/170.1 |
| 2011/0239661 A1* | 10/2011 | Belmonte et al. ............... 60/796 |

OTHER PUBLICATIONS

International Search Report and Written Opinion for International Application No. PCT/US2013/039616 completed on Dec. 17, 2013.

\* cited by examiner

GAS TURBINE ENGINE COMPRESSOR STATOR SEAL

STATEMENT REGARDING FEDERALLY SPONSORED RESEARCH OR DEVELOPMENT

This invention was made with government support under Contract No. N00019-12-D-002-4Y01-DOA1 awarded by the United States Navy. The Government has certain rights in this invention.

BACKGROUND OF THE INVENTION

This application relates to a seal between a compressor rotor and a stator vane.

Gas turbine engines are known, and typically include a compressor stage which compresses air and delivers it into a combustor stage. The air is mixed with fuel and ignited in the combustor stage, and products of that combustion pass downstream over turbine rotors, driving them to rotate.

It is a desire of modern turbine designer to increase the efficiency of all aspects of the turbine engine operation. One loss of efficiency occurs when air leaks within the compressor section. Typically, the compressor section includes a plurality of rotating sets of blades, each defining a stage of compression. Static vanes having airfoils are positioned intermediate the rotating compressor blades, and served to redirect airflow between the serial stages.

It is possible for air to leak between the rotor, and an inner periphery of the stator vane. This air is thus not redirected, as desired, and hurts efficiency.

It is also often the case that a fan delivers air into the compressor stage. Typically, both the compressor and fan have been driven directly by turbine rotors. More recently a gear reduction has been employed between the fan and a turbine rotor to allow the fan to rotate at a slower speed.

The use of the gear reduction has allowed the fan to become larger in diameter. In addition, the fans may deliver air into a bypass duct, as well as to the compressor. It is desirable to increase the overall efficiency of the gas turbine engine such that a higher percentage of air can be delivered into the bypass duct. Thus, the efficient compression of the air within the compressor section becomes even more desirable when utilized in a gas turbine engine utilizing a gear reduction drive for a fan.

Any number of types of seal have been utilized. One known type of seal includes an abradable material, and a plurality of knife-edge seals rotating with the rotor. This seal construction typically extends further inwardly than may be desired, and requires a large number of parts.

SUMMARY OF THE INVENTION

In one featured embodiment, a compressor section for use in a gas turbine engine has a plurality of compressor stages, each provided with a rotor hub. Each rotor hub mounts a plurality of compressor blades. A rotor drum extends between the adjacent rotor hubs. A plurality of stator stages have a radially outer ring and a radially inner ring, with a plurality of vanes extending between the outer and inner rings. An inner surface of the inner ring is spaced by a gap from an outer surface of the rotor drum. The rotor drum is provided with a plurality of blades having a general airfoil shape to resist leakage across the gap.

In another embodiment according to the previous embodiment, the inner surface of the inner ring has a small bump axially aligned with a portion of the plurality of blades In another embodiment according to any of the previous embodiments, the drum has a portion which is generally flat, and spaced by a constant distance from what will be a center of rotation of the rotor hubs. The blades are on the flat portion.

In another embodiment according to any of the previous embodiments, there are frustoconical portions positioned upstream and downstream of the flat portion with a larger portion of each frustoconical portion being spaced downstream of a smaller portion.

In another embodiment according to any of the previous embodiments, the rotor hubs have a generally axially enlarged radially outer portion, and an axially thinner neck portion extending radially inwardly. The rotor drum is connected to the rotor hubs at the generally enlarged portion.

In another embodiment according to any of the previous embodiments, the inner face of the inner ring is provided with vanes.

In another embodiment according to any of the previous embodiments, the vanes on the inner ring are downstream of the blades on the rotor drum.

In another embodiment according to any of the previous embodiments, the inner and outer rings include a plurality of ring segments. The ring segments are connected together to extend for 360 degrees across a central axis.

In another featured embodiment, a gas turbine engine has a compressor, a combustor and a turbine. The turbine is configured to drive a compressor rotor about an axis. The compressor rotor includes a plurality of compressor stages, each provided with a rotor hub, and each rotor hub mounting a plurality of compressor blades. A rotor drum extends between the adjacent rotor hubs. A plurality of stator vanes have a radially outer ring and a radially inner ring. A plurality of vanes extends between the outer and inner rings. An inner surface of the inner ring is spaced by a gap from an outer surface of the rotor drum. The rotor drum is provided with a plurality of blades having a general airfoil shape to resist leakage across the gap.

In another embodiment according to the previous embodiment, the inner surface of the inner ring has a small bump axially aligned with a portion of the plurality of blades.

In another embodiment according to any of the previous embodiments, the drum has a portion which is generally flat, and spaced by a constant distance from the axis. The blades are on the flat portion.

In another embodiment according to any of the previous embodiments, there are frustoconical increasing portions positioned upstream and downstream of the flat portion with a larger portion of each frustoconical portion being spaced downstream of a smaller portion.

In another embodiment according to any of the previous embodiments, the rotor hubs have a generally axially enlarged radially outer portion, and an axially thinner neck portion extending radially inwardly. The drum is connected to the rotor hubs at the generally enlarged portion.

In another embodiment according to any of the previous embodiments, the inner face of the inner ring is provided with vanes.

In another embodiment according to any of the previous embodiments, the vanes on the inner ring are downstream of the blades on the rotor drum.

In another embodiment according to any of the previous embodiments, the inner and outer rings include a plurality of ring segments. The ring segments are connected together to extend for 360 degrees across the central axis.

In another featured embodiment, a compressor section has a plurality of compressor stages configured to rotate about an axis, each being provided with a rotor hub. Each rotor hub mounts a plurality of compressor blades. A rotor drum is extended between the adjacent rotor hubs. A plurality of stator stages have a radially outer ring and a radially inner ring, with a plurality of vanes extending between the outer and inner rings. An inner surface of the inner ring is spaced by a gap from an outer surface of the rotor drum. The rotor drum is provided with a plurality of blades having a general airfoil shape to resist leakage across the gap. The drum has a portion which is generally flat, and spaced by a constant distance from the axis. The blades are on the flat portion. There are frustoconical increasing portions positioned upstream and downstream of the flat portion with a larger portion of each frustoconical portion being spaced downstream of a smaller portion. The rotor hubs have a generally axially enlarged radially outer portion, and an axially thinner neck portion extending radially inwardly. The drum is connected to the rotor hubs at the generally enlarged portion.

In another embodiment according to any of the previous embodiments, the inner surface of the inner ring is ring has a small bump axially aligned with a portion of the plurality of blades.

In another embodiment according to any of the previous embodiments, the inner face of the inner ring is provided with vanes.

In another embodiment according to any of the previous embodiments, the vanes on the inner ring are downstream of the blades on the rotor drum.

These and other features of this application will be best understood from the following specification and drawings, the following of which is a brief description.

DETAILED DESCRIPTION

Figure 1:
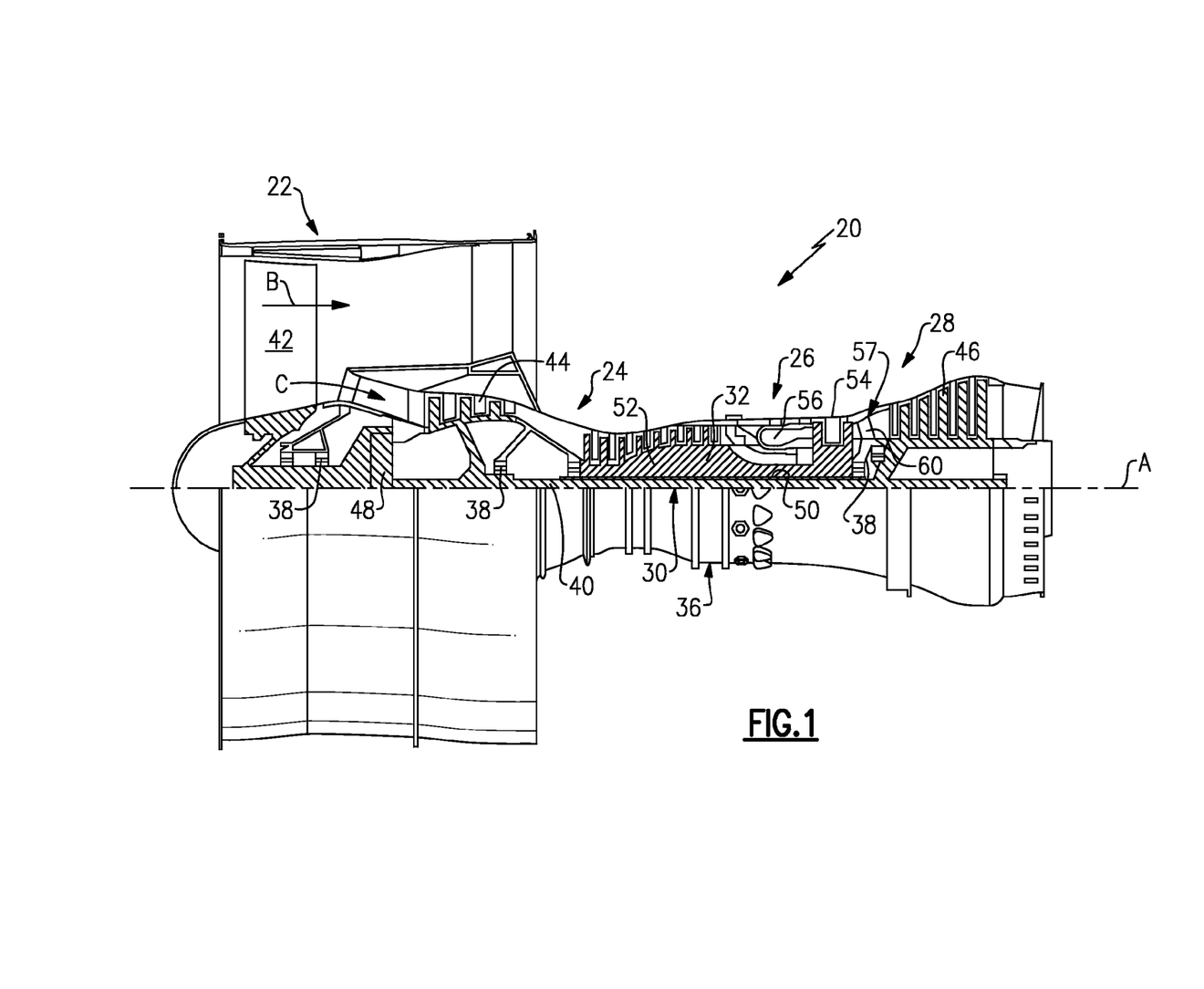
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 60 of the engine static structure 36 is arranged generally between the high pressure turbine 54 and the low pressure turbine 46. The mid-turbine frame 60 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 60 includes airfoils which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
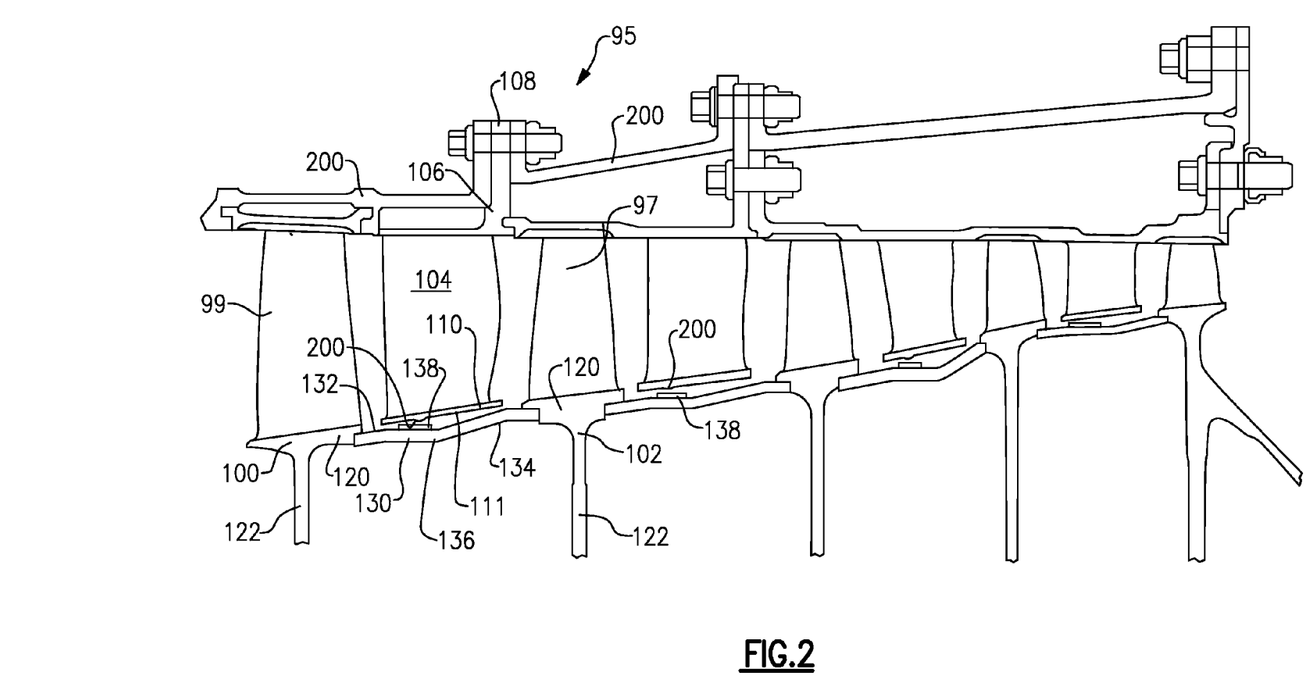
FIG. 2 is a cross-sectional view through a portion of a compressor.

FIG. 2 shows a compressor section 95 that may be incorporated into the gas turbine engine as shown in FIG. 1. Notably, the compressor section as disclosed in this application would provide benefits in gas turbine engines without a fan, or those without a gear reduction driving the fan. Still there are increased benefits to improving the efficiency of the compressor section when utilized with a geared turbofan gas turbine engine.

Compressor section 95 has a plurality of stages including rotating blades 99 and 97. As can be seen, there are even further stages downstream as shown in this Figure. The flow of air through the gas turbine engine would be from the left to the right in this Figure. The blades 99 and 97 rotate with hubs 100 and 102, respectively. As shown, the hubs have an enlarged cylindrical outer ring 120. The outer ring 120 extends for a greater axial distance (with axial being defined along the center axis) than an inner connecting neck or thin portion 122. A drum 130 extends between the enlarged rings 120. The drum 130 includes a first frustoconical upstream portion 132 and a downstream frustoconical portion 134. A flat portion 136 is intermediate the frustoconical portions 132 and 134, and carries blades 138.

As can be appreciated, the upstream frustoconical and downstream frustoconical portions 132 and 134 increase in diameter in a direction moving downstream. That is, there is a larger portion of each frustoconical portion spaced downstream of a smaller portion.

Vanes 104 are positioned intermediate each set of turbine blade sets 99 and 97. The vanes 104 redirect air from one compression stage 99 to the next downstream compression stage 97 and 104 have an airfoil shape, as known. An outer ring 106 connects a plurality of adjacent vanes 104, and includes a connecting lug 108 which receives bolts to secure the vane 104 into an outer housing section 200. An inner ring 110 extends circumferentially to connect a plurality of circumferentially adjacent vanes 104.

As can be appreciated from FIG. 2, the rotor hubs 100 and 102 are driven to rotate, and carry blades 99 and 97 along. The hub 130 is driven to rotate with the rotor hubs, 100 and 102, and as the drum 130 rotates, the blades 138 drive air to the right as shown in FIG. 2, or downstream, to resist leakage across the area of air upstream, and between the drum 130 and the inner ring 110. An inner surface 111 of the inner ring 110 is generally smooth, and frustoconical. The inner surface 111 extends axially across section 136 and partially over sections 132 and 134.

A bump 200 is formed on the inner surface 111 of the inner ring or shroud 110. Thus, the inner surface 111 is not actually entirely smooth, but instead has the small bump 200 which is positioned axially at a location aligned with a portion of the blades 138. The bump assists in setting a minimal gap between the blades 138 and the inner surface 111.

This arrangement results in a number of the benefits when compared with the prior art seals which utilize knife-edge seals. For one, the knife-edge seals typically have their sealing surface radially inwardly, and their drums mounted between the thin portions 122. This increased the area across which the seal must be provided. In addition, the prior art knife-edge seals include a number of separate parts when compared to the embodiment shown in FIG. 2. In addition, the efficiency of the embodiment shown in FIG. 2 is improved when compared to the prior art.

Figure 3:
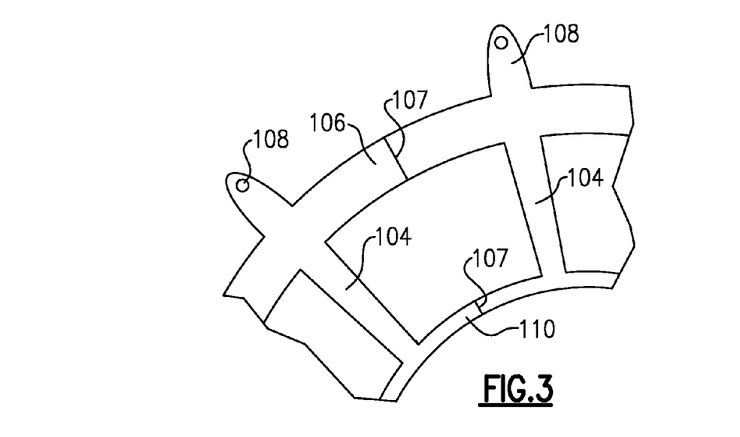
FIG. 3 shows a segment of a vane structure.

FIG. 3 shows a detail of vane sections 104. As shown, there are a plurality of vanes 104 circumferentially spaced. The rings 106 and 110 extend between the circumferentially spaced vanes 104. A break 107 is shown between two vane sections. The vane can be assembled as a complete circumferentially continuous unit, or it may be segmented as shown at 107 to facilitate assembly. However, as assembled, the rings 106 and 110 may typically be continuous and extend across 360°.

Figure 4:
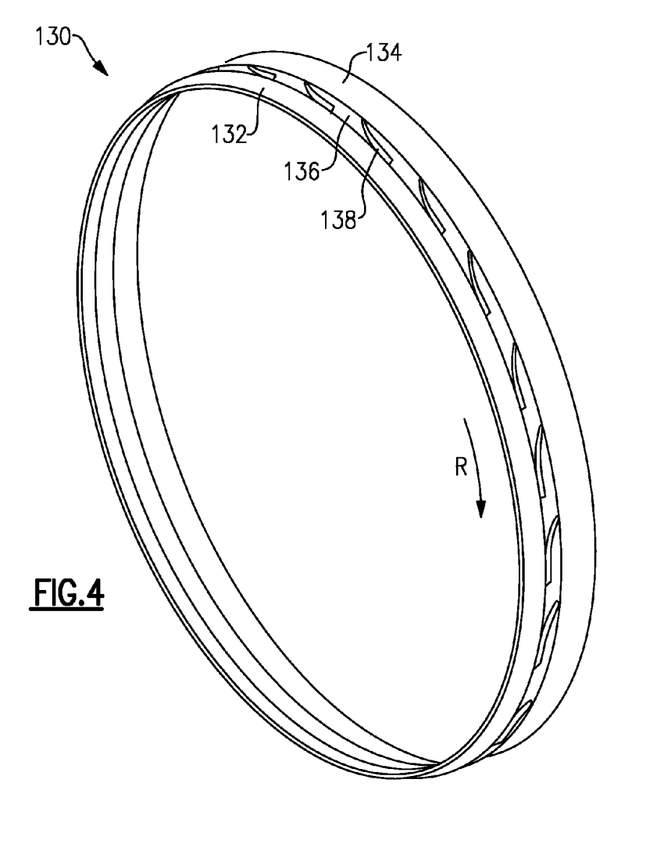
FIG. 4 shows a rotor drum.

FIG. 4 shows the drum 130. As shown, the frustoconical sections 132 and 134 are spaced from the flat portion 136. As can be appreciated from FIG. 2 and FIG. 4, the flat portion 136 is generally spaced from the centerline of the engine by a constant distance across its axial extent. On the other hand, the sections 132 and 134 extend along an increasing distance from the centerline as one moves axially upstream further into the gas turbine engine.

Figure 5:
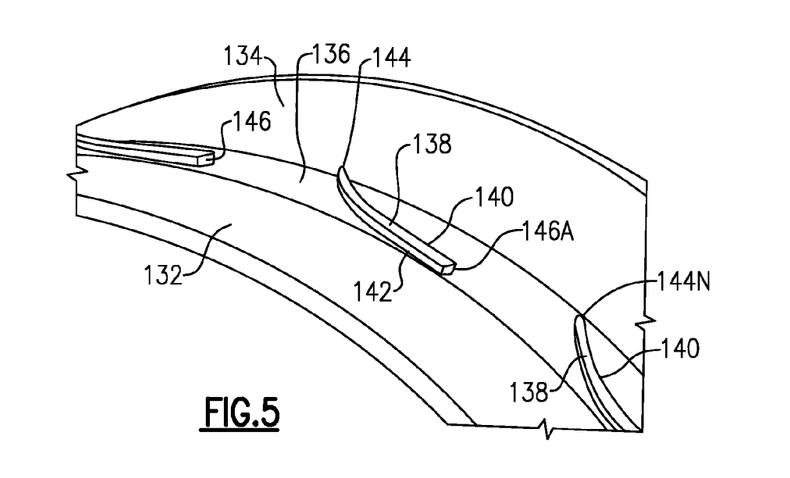
FIG. 5 shows a portion of the FIG. 4 drum.

As can be appreciated from FIG. 5, the blades 138 have an airfoil shape. The rotation R would be clockwise for the embodiment shown in FIG. 4.

The blades 138 have a downstream curved side 140 and an upstream curved side 142. A trailing edge 144 is spaced from leading edge 146. As shown, the trailing edge 144N for the next adjacent blade 138 is further downstream than is the leading edge 146A of the adjacent blade.

Figure 6:
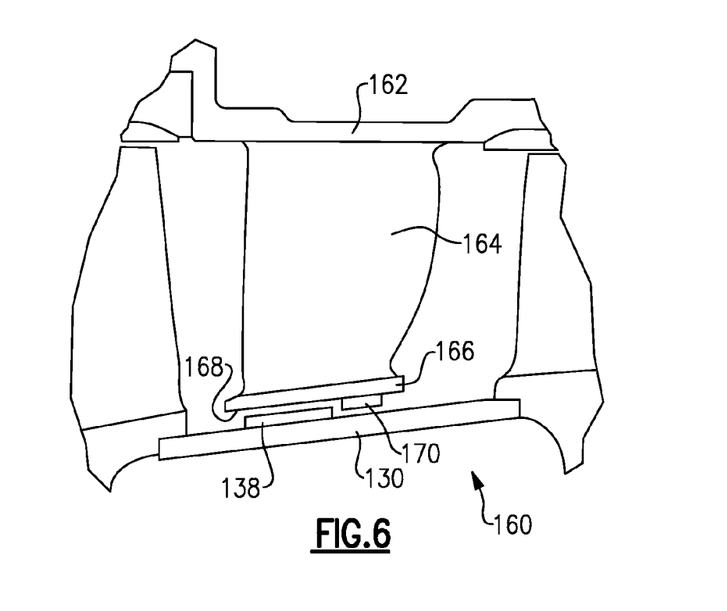
FIG. 6 shows an alternate embodiment.

FIG. 6 shows another embodiment, wherein the vanes 164 are provided with the outer ring 162 and 166 as in the prior embodiment. However, the inner surface 168 on the ring 166 is also provided with vanes 170. Vanes 170 serve to redirect any swirl which may be produced by the blades 138. Note that the vanes 170 are downstream of the blades 138.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A compressor section for use in a gas turbine engine comprising:
   a plurality of compressor stages, each of said compressor stages provided with a rotor hub, and each said rotor hub mounting a plurality of compressor blades;
   a rotor drum extending between said adjacent rotor hubs;
   a plurality of stator vanes having a radially outer ring and a radially inner ring, with a plurality of vanes extending between said outer and inner rings, and an inner surface of said inner ring being spaced by a gap from an outer surface of said rotor drum;
   said rotor drum being provided with a plurality of blades having a general airfoil shape to resist leakage across said gap;
   said inner surface of said inner ring has a small bump axially aligned with a portion of said plurality of blades;
   said drum has a portion which is generally flat, and spaced by a constant distance from what will be a center of rotation of said rotor hubs, and said blades being on said flat portion; and
   wherein there are frustoconical portions positioned upstream and downstream of said flat portion with a larger portion of each frustoconical portion being spaced downstream of a smaller portion.

2. A gas turbine engine comprising:
   a compressor, a combustor and a turbine, said turbine configured to drive a compressor rotor about an axis;
   the compressor rotor including a plurality of compressor stages, each of said compressor stages provided with a rotor hub, and each said rotor hub mounting a plurality of compressor blades, a rotor drum extending between said adjacent rotor hubs, a plurality of stator vanes having a radially outer ring and a radially inner ring, with a plurality of vanes extending between said outer and inner rings, and an inner surface of said inner ring being spaced by a gap from an outer surface of said rotor drum, said rotor drum being provided with a plurality of blades having a general airfoil shape to resist leakage across said gap;

said drum has a portion which is generally flat, and spaced by a constant distance from said axis, and said blades being on said flat portion;

wherein there are frustoconical increasing portions positioned upstream and downstream of said flat portion with a larger portion of each frustoconical portion being spaced downstream of a smaller portions; and said inner surface of said inner ring has a small bump axially aligned with a portion of said plurality of blades.

3. A compressor section comprising:

a plurality of compressor stages configured to rotate about an axis, each of said compressor stages provided with a rotor hub, and each said rotor hub mounting a plurality of compressor blades, a rotor drum extending between said adjacent rotor hubs, a plurality of stator vanes having a radially outer ring and a radially inner ring, with a plurality of vanes extending between said outer and inner rings, and an inner surface of said inner ring being spaced by a gap from an outer surface of said rotor drum, said rotor drum being provided with a plurality of blades having a general airfoil shape to resist leakage across said gap;

said drum having a portion which is generally flat, and spaced by a constant distance from said axis, and said blades being on said flat portion;

there being frustoconical increasing portions positioned upstream and downstream of said flat portion with a larger portion of each frustoconical portion being spaced downstream of a smaller portion;

said rotor hubs having a generally axially enlarged radially outer portion, and an axially thinner neck portion extending radially inwardly, and said drum being connected to said rotor hubs at said generally enlarged portion; and said inner surface of said inner ring has a small bump axially aligned with with a portion of said plurality of blades.

* * * * *

UNITED STATES PATENT AND TRADEMARK OFFICE
CERTIFICATE OF CORRECTION

PATENT NO. : 9,169,849 B2  
APPLICATION NO. : 13/466549  
DATED : October 27, 2015  
INVENTOR(S) : Eric J. Ward Page 1 of 1

It is certified that error appears in the above-identified patent and that said Letters Patent is hereby corrected as shown below:

IN THE CLAIMS:

In claim 2, column 7, line 10; delete "portions;" and replace with --portion;--

Signed and Sealed this
Fifteenth Day of March, 2016

Michelle K. Lee
*Director of the United States Patent and Trademark Office*